(12) United States Patent
Kubota et al.

(10) Patent No.: US 11,710,830 B2
(45) Date of Patent: Jul. 25, 2023

(54) ELECTRODE LAMINATE FOR ALL-SOLID-STATE BATTERIES AND METHOD FOR PRODUCING THE ELECTRODE LAMINATE

(71) Applicant: TOYOTA JIDOSHA KABUSHIKI KAISHA, Toyota (JP)

(72) Inventors: Seiko Kubota, Toyota (JP); Masato Ono, Toyota (JP); Kazuhito Kato, Toyota (JP); Norihiro Ose, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 484 days.

(21) Appl. No.: 16/700,353

(22) Filed: Dec. 2, 2019

(65) Prior Publication Data

US 2020/0185726 A1 Jun. 11, 2020

(30) Foreign Application Priority Data

Dec. 5, 2018 (JP) .................................. 2018-228379
Oct. 2, 2019 (JP) .................................. 2019-182448

(51) Int. Cl.
*H01M 4/66* (2006.01)
*H01M 4/04* (2006.01)
*H01M 10/0585* (2010.01)

(52) U.S. Cl.
CPC ......... *H01M 4/667* (2013.01); *H01M 4/0404* (2013.01); *H01M 10/0585* (2013.01)

(58) Field of Classification Search
None
See application file for complete search history.

(56) References Cited

U.S. PATENT DOCUMENTS

2010/0086849 A1 4/2010 Mizuno et al.
2012/0315537 A1 12/2012 Ravdel et al.
(Continued)

FOREIGN PATENT DOCUMENTS

CN 101719542 A 6/2010
CN 102881914 A 1/2013
(Continued)

OTHER PUBLICATIONS

Shinji Kojima, U.S. Appl. No. 16/659,665, for Method for Producing All-Solid-State Battery, filed Oct. 22, 2019.

*Primary Examiner* — Daniel S Gatewood
(74) *Attorney, Agent, or Firm* — Dickinson Wright, PLLC

(57) ABSTRACT

Provided is an electrode laminate for all-solid-state batteries, which is configured to suppress the occurrence of short circuits in all-solid-state batteries and/or to suppress a decrease in the durability of all-solid-state batteries, and which is configured to suppress an increase in the resistance value of all-solid-state batteries. Disclosed is an electrode laminate for all-solid-state batteries, comprising: a current collector complex comprising adhesive portions and a current collector portion that comprises at least a current collector, and an active material layer disposed on the current collector complex, wherein an active material layer-side main surface of the current collector portion and active material layer-side main surfaces of the adhesive portions are formed to be one flat surface, and the current collector portion and the active material layer are attached by the adhesive portions.

6 Claims, 9 Drawing Sheets

(56) References Cited

U.S. PATENT DOCUMENTS

| | | | |
|---|---|---|---|
| 2013/0017440 A1 | 1/2013 | Takano | |
| 2015/0086875 A1* | 3/2015 | Yoshida | H01M 4/139 |
| | | | 429/304 |
| 2016/0329602 A1 | 11/2016 | Kojima | |
| 2019/0181431 A1* | 6/2019 | Canton | H01M 4/133 |
| 2019/0305319 A1* | 10/2019 | Liang | H01M 4/66 |
| 2020/0136190 A1* | 4/2020 | Yamashita | H01M 10/0585 |
| 2020/0365900 A1* | 11/2020 | Yawata | H01M 4/64 |

FOREIGN PATENT DOCUMENTS

| | | |
|---|---|---|
| JP | 2004273181 A | 9/2004 |
| JP | 2016213070 A | 12/2016 |
| JP | 2017204377 A | 11/2017 |

\* cited by examiner (a)

(b)

(c)

ELECTRODE LAMINATE FOR ALL-SOLID-STATE BATTERIES AND METHOD FOR PRODUCING THE ELECTRODE LAMINATE

TECHNICAL FIELD

The disclosure relates to an electrode laminate for all-solid-state batteries, and a method for producing the electrode laminate.

BACKGROUND

An all-solid-state battery formed by laminating electrode laminates for all-solid-state batteries is known, the electrode laminates each comprising a current collector and a cathode or anode active material layer (hereinafter may be simply referred to as "active material layer").

In recent years, there is a demand for an all-solid-state battery with high voltage and high capacity, and there is an increasing demand for a laminate-type all-solid-state battery formed by laminating a plurality of the above-described electrode laminates.

For example, Patent Literature 1 discloses an all-solid-state battery comprising a plurality of battery units, in which the current collectors of the battery units are attached to, by use of a thermoplastic resin, other battery units that are disposed adjacent to the current collectors, whereby the laminated battery units are fixed to be prevented from misalignment. Patent Literature 1 shows an embodiment in which the thermoplastic resin is applied to a part of the surface of each current collector, and the current collectors and other battery units are attached by the applied thermoplastic resin.

The above-described, laminate-type all-solid-state battery is required to fix the current collector and active material layer of each electrode laminate to ensure that misalignment does not occur between the laminated current collector and active material layer. For example, an electrode plate for battery is disclosed in Patent Literature 2, in which a current collector and an active material are attached by an adhesion layer composed of a polyamideimide resin containing carbon. Also, Patent Literature 2 discloses such an embodiment that the current collector and the active material layer are attached by the adhesion layer disposed in the whole region between the current collector and the active material layer.

In recent years, laser light techniques are used for the production of such a laminate-type all-solid-state battery.

For example, Patent Literature 3 discloses a method for manufacturing a battery laminate, in which a laminate arranged by laminating a first active material layer and a solid electrolyte layer, is irradiated with a laser of a predetermined wavelength, thereby removing a part of the first active material layer with maintaining the solid electrolyte layer.

Patent Literature 1: Japanese Patent Application Laid-Open (JP-A) No. 2017-204377

Patent Literature 2: JP-A No. 2004-273181

Patent Literature 3: JP-A No. 2016-213070

For example, an all-solid-state battery is produced by laminating electrode laminates, each of which is produced by applying an adhesive to a part of a region between the current collector and active material layer of each electrode laminate (for example, the embodiment provided as an example in Patent Literature 1) and attaching the current collector and the active material layer. When the all-solid-state battery repeats charge-discharge cycles, there are the following problems, for example: a crack is formed in the active material layer or current collector and causes short circuits, and the durability of the all-solid-state battery decreases.

The all-solid-state battery as disclosed in Patent Literature 2 (the all-solid-state battery comprising the electrode laminates described above, each of which is formed by applying the adhesive to the whole region between the current collector and the active material layer and attaching them by the adhesive) faces the following problem: since the resistance value of the all-solid-state battery increases too much, the battery fails to obtain sufficient battery performance.

According to the technique disclosed in Patent Literature 3, the battery laminate, which enables the suppression of short circuit between the active material layers of a battery, can be efficiently produced by irradiating the laminate arranged by laminating the first active material layer and the solid electrolyte layer with laser light, thereby removing a part of the first active material layer with maintaining the solid electrolyte layer. However, the technique disclosed in Patent Literature 3 has the following problem: since the layers are not attached by an adhesive, etc., the laminated layers fail to suppress misalignment.

SUMMARY

In light of the above circumstances, an object of the disclosed embodiments is to provide an electrode laminate for all-solid-state batteries, which is configured to suppress the occurrence of short circuits in all-solid-state batteries and/or to suppress a decrease in the durability of all-solid-state batteries, and which is configured to suppress an increase in the resistance value of all-solid-state batteries.

In a first embodiment, there is provided an electrode laminate for all-solid-state batteries, comprising:

a current collector complex comprising adhesive portions and a current collector portion that comprises at least a current collector, and an active material layer disposed on the current collector complex, wherein an active material layer-side main surface of the current collector portion and active material layer-side main surfaces of the adhesive portions are formed to be one flat surface, and the current collector portion and the active material layer are attached by the adhesive portions.

In another embodiment, there is provided a method for producing an electrode laminate for all-solid-state batteries, the method comprising:

forming a current collector complex comprising adhesive portions and a current collector portion that comprises at least a current collector, wherein a main surface of the current collector portion and main surfaces of the adhesive portions are formed to be one flat surface, and attaching the current collector portion and an active material layer by the adhesive portions by forming the active material layer on a main surface of the current collector complex, which is a main surface on a side where the adhesive portions are exposed.

According to the disclosed embodiments, an electrode laminate for all-solid-state batteries can be provided, which is configured to suppress the occurrence of short circuits in all-solid-state batteries and/or to suppress a decrease in the durability of all-solid-state batteries, and which is configured to suppress an increase in the resistance value of all-solid-state batteries.

BRIEF DESCRIPTION OF THE DRAWINGS

In the accompanying drawings.

DETAILED DESCRIPTION

1. Electrode Laminate for all-Solid-State Batteries

The electrode laminate for all-solid-state batteries according to the disclosed embodiments, is an electrode laminate for all-solid-state batteries, comprising:

a current collector complex comprising adhesive portions and a current collector portion that comprises at least a current collector, and an active material layer disposed on the current collector complex, wherein an active material layer-side main surface of the current collector portion and active material layer-side main surfaces of the adhesive portions are formed to be one flat surface, and the current collector portion and the active material layer are attached by the adhesive portions.

Figure 13:
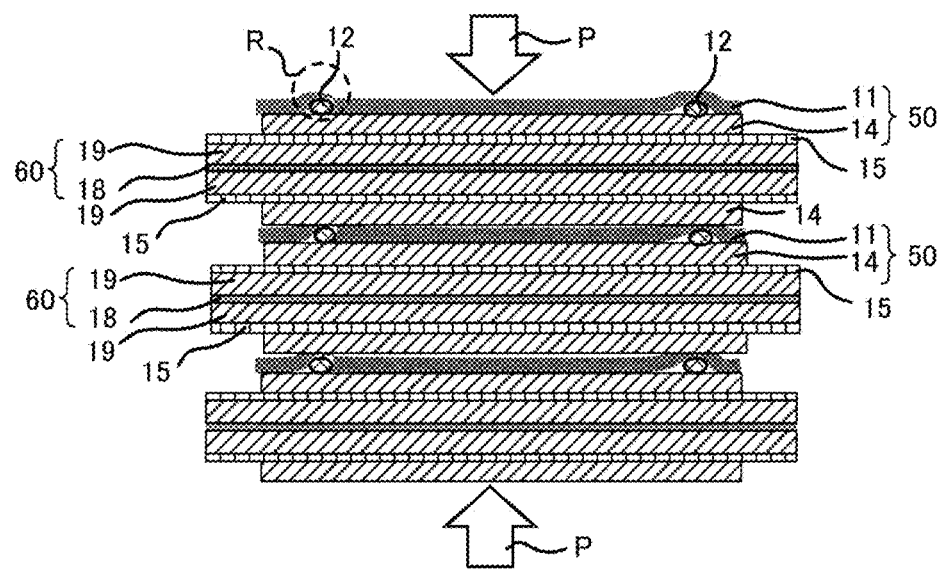
FIG. 13 is a schematic sectional view of an example of the structure of a laminate-type all-solid-state battery comprising a conventional electrode laminate.

FIG. 13 is a schematic sectional view of an example of the structure of a laminate-type all-solid-state battery comprising a conventional electrode laminate.

A conventional electrode laminate 50 (cathode-side) included in the laminate-type all-solid-state battery shown in FIG. 13, comprises a cathode current collector 11 and a cathode active material layer 14, and the cathode current collector 11 and the cathode active material layer 14 are attached by adhesive portions 12 formed by applying an adhesive to a part of a region between the cathode current collector 11 and the cathode active material layer 14.

In the all-solid-state battery shown in FIG. 13, each electrode laminate 60 (anode-side) is connected to each electrode laminate 50 (cathode-side) via each solid electrolyte layer 15. Each anode-side electrode laminate 60 is connected to each electrode laminate 50 (cathode-side) to ensure that the anode active material layer 19 and anode current collector 18 of each anode-side electrode laminate 60 are arranged in this order from as seem from the cathode active material layer 14 of each cathode-side electrode laminate 50.

When such a laminate-type all-solid-state battery comprising the conventional electrode laminates 50 (cathode-side) repeats charge-discharge cycles, there are the following problems, for example: a crack is formed in the cathode active material layer 14 and/or the cathode current collector 11 and causes short circuits, and the durability of the all-solid-state battery decreases.

The reason for the problems seems to be as follows.

As shown in FIG. 13, when the cathode current collector 11 and the cathode active material layer 14 are attached by the adhesive portions 12 formed by applying the adhesive to a part of the region between the cathode current collector 11 and the cathode active material layer 14, a level difference R is formed due to the difference between the thickness of the electrode laminate 50 at the portions where the adhesive is applied (hereinafter, the part may be referred to as "adhesive portions" or "adhesive applied portions") and the thickness of the electrode laminate 50 at a portion where the adhesive is not applied. For a laminate structure composed of a plurality of the electrode laminates 50, the cumulative total value of the level differences R increases and results in a large level difference as a whole.

For example, even if the thickness of the adhesive portions attaching the cathode current collector 11 and cathode active material layer 14 of the electrode laminate 50 is controlled to 2 μm, the cumulative total value of the level differences reaches 80 μm in the case of laminating a total of 40 electrode laminates 50 (cathode-side) are laminated.

When the all-solid-state battery having the laminate structure with such a large level difference repeats charge-discharge cycles, the confining pressure P of the battery increases along with the expansion of the active material layer, and stress is concentrated at the adhesive applied portions (convexities) forming the above-mentioned level difference R. Due to the stress, a crack is likely to be formed in the cathode active material layer 14 and/or the cathode current collector 11, and short circuits are likely to occur.

In the laminate-type all-solid-state battery having the laminate structure with the large level difference, as described above, since stress is concentrated at the adhesive applied portions (convexities) forming the level difference R, the confining pressure P is not sufficiently applied by a confining member or the like to the interface between the cathode current collector 11 and the cathode active material layer 14, which is a region other than the adhesive applied portions. Accordingly, non-uniform surface pressure distribution occurs in the interface between the cathode current collector 11 and the cathode active material layer 14.

Due to such a non-uniform surface pressure distribution, a Li deposit is likely to be formed in the interface between the cathode current collector 11 and the cathode active material layer 14, and the durability of the all-solid-state battery decreases.

However, as will be described below, the above problems can be solved by the electrode laminate for all-solid-state batteries according to the disclosed embodiments.

1-1. First Embodiment

First, the electrode laminate for all-solid-state batteries according to the first embodiment, will be described.

Figure 1A:
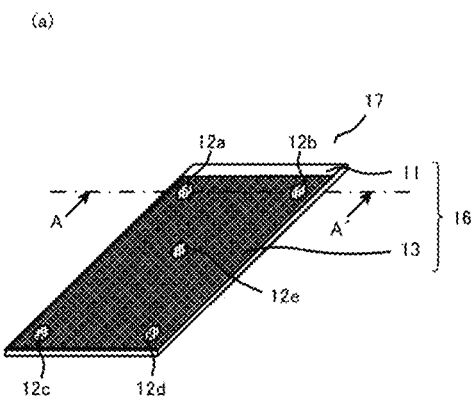
FIGS. 1a and 1b are views illustrating an example of the electrode laminate for all-solid-state batteries according to the first embodiment (an electrode laminate 10)
Figure 1B:
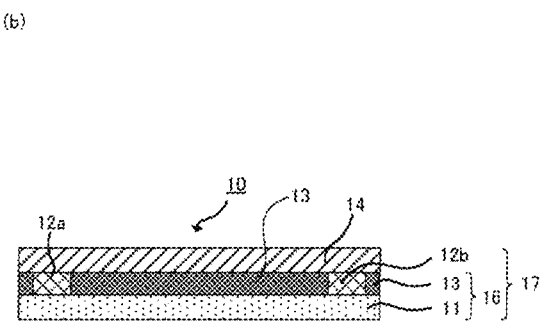

FIGS. 1a and 1b are views illustrating an example of the electrode laminate for all-solid-state batteries according to the first embodiment (an electrode laminate 10).

For the purpose of explaining the structure of the electrode laminate for all-solid-state batteries according to the first embodiment, FIG. 1a is a perspective view briefly illustrating the structure of the electrode laminate of the first embodiment, prior to disposing the cathode active material layer on the carbon coat layer. FIG. 1b is a sectional view of the electrode laminate of the first embodiment, along the A-A' line shown in FIG. 1a, after disposing the cathode active material layer on the carbon coat layer.

An electrode laminate for all-solid-state batteries 10 according to the first embodiment, comprises a current collector complex 17 comprising a current collector portion 16 and adhesive portions 12a to 12e. The current collector portion 16 comprises a cathode current collector 11 and a carbon coat layer 13 formed on the cathode current collector 11. The adhesive portions 12a to 12e are formed in a part of the carbon coat layer 13.

A cathode active material layer 14 is disposed on the current collector complex 17. The cathode active material layer 14 and the current collector portion 16 are attached by the adhesive portions 12a to 12e formed in the carbon coat layer 13.

In the example shown in FIG. 1a, the carbon coat layer 13 is formed on the cathode current collector 11, while a region on one of the end edge sides in the longitudinal direction of the cathode current collector 11, is left uncoated with the carbon coat layer 13.

The carbon coat layer 13 may be disposed on the cathode current collector 11 to ensure that, when the electrode laminate 10 is viewed from above, a region of the cathode active material layer 14-facing side main surface of the cathode current collector 11, in which the cathode current collector 11 overlaps with the cathode active material layer 14, is wholly coated with the carbon coat layer 13 and the below-described adhesive portions 12a to 12e.

In the example shown in FIG. 1a, the adhesive portions 12a to 12d are disposed at the four corners of the carbon coat layer 13, and the adhesive portion 12e is disposed at the center of the carbon coat layer 13.

More specifically, the adhesive portions 12a to 12e are solidified composition products formed as follows: through holes are formed at the above-described four corners and center of the carbon coat layer 13 and used as concavities 12a' to 12e' (see (b) of FIG. 4); the concavities are filled with a composition for forming the adhesive portions; and the composition filling the concavities is solidified, thereby forming the adhesive portions 12a to 12e.

The adhesive portions 12a to 12e and the carbon coat layer 13 are continuously disposed, without allowing a space to be formed between the adhesive portions 12a to 12e and the carbon coat layer 13.

In the electrode laminate 10 of the disclosed embodiments, the cathode active material layer 14-side main surface of the current collector portion 16 (that is, the main surface of the carbon coat layer 13) and the cathode active material layer 14-side main surfaces of the adhesive portions 12a to 12e are formed to be one flat surface. As used herein, the phrase "formed to be one flat surface" can be rephrased as "formed to be horizontal or flat".

In the electrode laminate 10 of the disclosed embodiments, as shown in FIG. 1a, the main surface of the carbon coat layer 13 is adjacent to the main surfaces of the adhesive portions 12a to 12e to form a continuous plane.

In the disclosed embodiments, "the main surface of the carbon coat layer is adjacent to the main surfaces of the adhesive portions to form a continuous plane" means that the main surface of the carbon coat layer and the main surfaces of the adhesive portions are formed to be one flat surface, without allowing a space to be formed between the main surface of the carbon coat layer and the main surfaces of the adhesive portions and result in a discontinuous plane.

Also in the example shown in FIG. 1a, the adhesive portions 12a to 12e have the same thickness as the carbon coat layer 13.

The example shown in FIG. 1b is an example in which concavities are not formed in the cathode current collector 11 and the adhesive portions 12a and 12b are the solidified composition products formed by filling the through holes formed in the carbon coat layer 13 with the composition for forming the adhesive portions and solidifying the composition filling the through holes. However, the electrode laminate of the disclosed embodiments is not limited to such an embodiment.

For example, concavities may be formed in the cathode current collector 11 present beneath the through holes formed in the carbon coat layer 13, or the adhesive portions may be solidified composition products formed by filling the through holes and the concavities with the composition for forming the adhesive portions and solidifying the composition filling the through holes and the concavities. In this case, the thicknesses of the adhesive portions are larger than the thickness of the carbon coat layer.

On the other hand, the adhesive portions may be solidified composition products formed in the carbon coat layer 13 by (1) forming concavities not penetrating the carbon coat layer 13, (2) filling the concavities with the composition for forming the adhesive portions, and (3) solidifying the composition filling the concavities. In this case, the thicknesses of the adhesive portions are smaller than the thickness of the carbon coat layer.

The example shown in FIG. 1a is an example in which the adhesive portions 12a to 12d are disposed at the four corners of the carbon coat layer 13, and the adhesive portion 12e is disposed at the center of the carbon coat layer 13. However, the positions of the adhesive portions are not limited to them.

For example, the adhesive portions may be disposed at a part of the four corners and center of the carbon coat layer 13. For example, of the positions of the adhesive portions 12a to 12e shown in FIG. 1a, the adhesive portions may be disposed only at the positions of the adhesive portions 12a, 12d and 12e, or the adhesive portions may be disposed only at the positions of the adhesive portions 12b, 12c and 12e.

For example, the adhesive portions may be disposed at a position on the diagonal line between the adhesive portions 12a and 12e of the carbon coat layer 13 shown in FIG. 1a and/or a position on the diagonal line between the adhesive portions 12d and 12e of the carbon coat layer 13 shown in FIG. 1a.

For example, the adhesive portions may be disposed at, along the long side of the carbon coat layer 13 shown in FIG. 1a, a position between the adhesive portions 12a and 12c and/or a position between the adhesive portions 12b and 12d. Also, the adhesive portions may be disposed at, along the short side of the carbon coat layer 13 shown in FIG. 1a, a position between the adhesive portions 12a and 12b and/or a position between the adhesive portions 12c and 12d.

Also, some of the above-described positions of the adhesive portions may be appropriately selected, and the adhesive portions may be disposed at the selected positions.

In all of the above-described cases, it should be noted that the adhesive portions and the carbon coat layer are continuously disposed, without allowing a space to be formed between the adhesive portions and the carbon coat layer, and the main surfaces of the adhesive portions and the main surface of the carbon coat layer are disposed to be one flat surface.

1-2. Second Embodiment

Next, the electrode laminate for all-solid-state batteries according to the second embodiment, will be described.

Figure 2A:
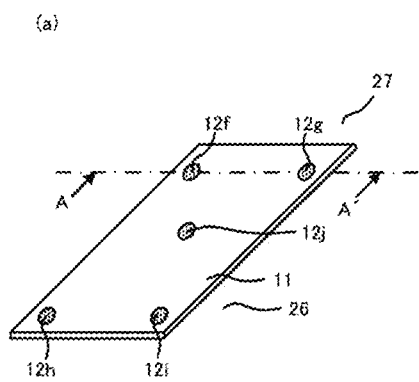
FIGS. 2a and 2b are views illustrating an example of the electrode laminate for all-solid-state batteries according to the second embodiment (an electrode laminate 20)
Figure 2B:
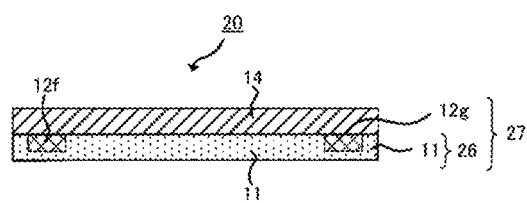

FIGS. 2a and 2b are views illustrating an example of the electrode laminate for all-solid-state batteries according to the second embodiment (an electrode laminate 20).

For the purpose of explaining the structure of the electrode laminate for all-solid-state batteries according to the second embodiment, FIG. 2a is a perspective view briefly illustrating the structure of the electrode laminate of the second embodiment, prior to disposing the cathode active material layer on the cathode current collector. FIG. 2b is a sectional view of the electrode laminate of the second embodiment, along the A-A' line shown in FIG. 2a, after disposing the cathode active material layer on the cathode current collector.

An electrode laminate for all-solid-state batteries 20 according to the second embodiment, comprises a current collector complex 27 comprising a current collector portion 26 and adhesive portions 12f to 12j. The current collector portion 26 comprises a cathode current collector 11. The adhesive portions 12f to 12j are formed in a part of the cathode current collector 11.

A cathode active material layer 14 is disposed on the current collector complex 27. The cathode active material layer 14 and the current collector portion 26 are attached by the adhesive portions 12f to 12j formed in the cathode current collector 11.

In the example shown in FIG. 2a, the adhesive portions 12f to 12i are formed at the four corners of the cathode current collector 11, and the adhesive portion 12j is formed at the center of the cathode current collector 11.

More specifically, the adhesive portions 12f to 12j are solidified composition products formed as follows: concavities 12f' to 12j' are formed at the above-described four corners and center of the cathode current collector 11 (see (a) of FIG. 6); the concavities 12f' to 12j' are filled with the composition for forming the adhesive portions; and the composition filling the concavities 12f' to 12j' is solidified, thereby forming the adhesive portions 12f to 12j.

The adhesive portions 12f to 12j and the cathode current collector 11 are continuously disposed, without allowing a space to be formed between the adhesive portions 12f to 12j and the cathode current collector 11.

In the electrode laminate 20 of the disclosed embodiments, the cathode active material layer 14-side main surface of the current collector portion 26 (that is, the cathode active material layer 14-side main surface of the cathode current collector 11) and the cathode active material layer 14-side main surfaces of the adhesive portions 12f to 12j are formed to be one flat surface.

In the electrode laminate 20 of the disclosed embodiments, as shown in FIG. 2a, the main surface of the cathode current collector 11 is adjacent to the main surfaces of the adhesive portions 12f to 12j to form a continuous plane.

In the disclosed embodiments, "the main surface of the cathode current collector is adjacent to the main surfaces of the adhesive portions to form a continuous plane" means that the main surface of the cathode current collector and the main surfaces of the adhesive portions are formed to be one flat surface, without allowing a space to be formed between the main surface of the cathode current collector and the main surfaces of the adhesive portions and result in a discontinuous plane.

The example shown in FIG. 2a is an example in which the adhesive portions 12f to 12i are disposed at the four corners of the cathode current collector 11, and the adhesive portion 12j is disposed at the center of the cathode current collector 11. However, the positions of the adhesive portions are not limited to them.

In the second embodiment, adhesive portions may be formed at other positions than the positions of the adhesive portions 12f to 12j of the cathode current collector 11 shown in FIG. 2a. As the other positions, examples include, but are not limited to, those exemplified above as the positions at which the adhesive portions may be formed in the carbon coat layer 13 of the above-described electrode laminate of the first embodiment.

In all of the above-described cases, it should be noted that the adhesive portions 12f to 12j and the cathode current collector 11 are continuously disposed, without allowing a space to be formed between the adhesive portions 12f to 12j and the cathode current collector 11, and the main surfaces of the adhesive portions 12f to 12j and the main surface of the cathode current collector 11 are disposed to be one flat surface.

1-3. Third Embodiment

Next, the electrode laminate for all-solid-state batteries according to the third embodiment, will be described.

Figure 3A:
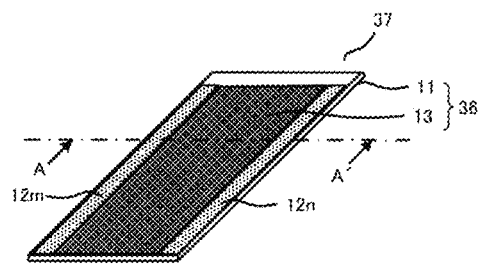
FIGS. 3a and 3b are views illustrating an example of the electrode laminate for all-solid-state batteries according to the third embodiment (an electrode laminate 30)
Figure 3B:
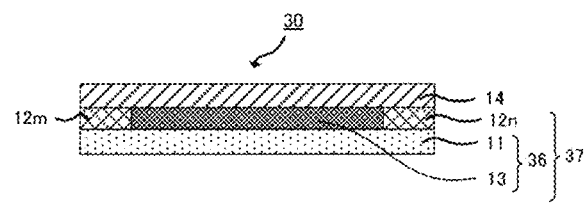

FIGS. 3a and 3b are views illustrating an example of the electrode laminate for all-solid-state batteries according to the third embodiment (an electrode laminate 30).

For the purpose of explaining the structure of the electrode laminate for all-solid-state batteries according to the third embodiment, FIG. 3a is a perspective view briefly illustrating the structure of the electrode laminate of the third embodiment, prior to disposing the cathode active material layer on the carbon coat layer. FIG. 3b is a sectional view of the electrode laminate of the third embodiment, along the A-A' line shown in FIG. 3a, after disposing the cathode active material layer on the carbon coat layer.

An electrode laminate for all-solid-state batteries 30 according to the third embodiment, comprises a current collector complex 37 comprising a current collector portion 36 and adhesive portions 12m and 12n. The current collector portion 36 comprises a cathode current collector 11 and a carbon coat layer 13 formed on the cathode current collector 11. The adhesive portions 12m and 12n are formed on a main surface of the cathode current collector 11, on which the carbon coat layer 13 is disposed.

A cathode active material layer 14 is disposed on the current collector complex 37. The cathode active material layer 14 and the current collector portion 36 are attached by the adhesive portions 12m and 12n formed on the cathode current collector 11.

That is, the electrode laminate for all-solid-state batteries 30 according to the third embodiment comprises the cathode current collector 11, the cathode active material layer 14 disposed on the cathode current collector 11 via the adhesive portions 12m and 12n, and the carbon coat layer 13 disposed between the cathode current collector 11 and the cathode active material layer 14.

In the example shown in FIG. 3a, the adhesive portions 12m and 12n are formed on both end edges in the width direction of the cathode current collector 11, as a pair of layers extending in the longitudinal direction of the cathode current collector 11.

In the disclosed embodiments, the width direction of the cathode current collector 11 means a direction perpendicular to the longitudinal direction of the cathode current collector 11.

The carbon coat layer 13 is disposed at the center in the width direction of the cathode current collector 11, that is, it is disposed in a region between the adhesive portions 12m and 12n.

As shown in FIG. 3b, the carbon coat layer 13 and the adhesive portion 12m are continuously disposed, without allowing a space to be formed between the carbon coat layer 13 and the adhesive portion 12m. Also, the carbon coat layer 13 and the adhesive portion 12n are continuously disposed, without allowing a space to be formed between the carbon coat layer 13 and the adhesive portion 12n.

In the electrode laminate 30 of the disclosed embodiments, the cathode active material layer 14-side main surface of the current collector portion 36 (that is, the main surface of the carbon coat layer 13) and the cathode active material layer 14-side main surface of the adhesive portion 12m are formed to be one flat surface, and the main surface of the carbon coat layer 13 and the cathode active material layer 14-side main surface of the adhesive portion 12n are formed to be one flat surface.

In the electrode laminate 30 of the disclosed embodiments, as shown in FIG. 3b, the main surface of the carbon coat layer 13 is adjacent to the main surface of the adhesive portion 12m to form a continuous plane, and the main surface of the carbon coat layer 13 is adjacent to the main surface of the adhesive portion 12n to form a continuous plane.

The carbon coat layer 13 has the same thickness as the adhesive portions 12m and 12n.

The adhesive portion 12m, the adhesive portion 12n and the carbon coat layer 13 may be disposed on the cathode current collector 11 to ensure that, when the electrode laminate 30 is viewed from above, a region of the cathode active material layer 14-facing side main surface of the cathode current collector 11, in which the cathode current collector 11 overlaps with the cathode active material layer 14, is wholly coated with the adhesive portion 12m, the adhesive portion 12n and the carbon coat layer 13.

The example shown in FIG. 3 is an example in which the adhesive portions 12m and 12n are disposed on both end edge sides in the width direction of the cathode current collector 11. The adhesive portions may be disposed on both end edge sides in the longitudinal direction of the cathode current collector 11, or they may be disposed on the both end edge sides in the width and longitudinal directions of the cathode current collector 11. Also, in the case of disposing only one adhesive portion, it may be disposed on any one of the end edge sides in the width direction of the cathode current collector 11, or it may be disposed on any one of the end edge sides in the longitudinal direction of the cathode current collector 11. Also, the adhesive portions may be disposed at the center in the width direction and the center in the longitudinal direction of the cathode current collector 11.

In all of the above-described cases, it should be noted that the carbon coat layer 13 and the adhesive portions are continuously disposed, without allowing a space to be formed between the carbon coat layer 13 and the adhesive portions, and the main surface of the carbon coat layer 13 and the main surfaces of the adhesive portions are formed to be one flat surface.

The above-described electrode laminate of the disclosed embodiments, comprises the current collector complex wherein the cathode active material layer-side main surface of the current collector portion that comprises at least the current collector and the cathode active material layer-side main surfaces of the adhesive portions are formed to be one flat surface, and the current collector portion and the cathode active material layer disposed on the current collector complex are attached by the adhesive portions.

That is, the main surface of the current collector complex, which is the main surface on the side that is in contact with the cathode active material layer, is a flat surface having no level difference.

Accordingly, an all-solid-state battery comprising a laminate structure composed of a plurality of the electrode laminate, can suppress such phenomenon that stress is locally concentrated inside the laminate structure, even when the confining pressure of the battery is increased by repeating charge-discharge cycles. Accordingly, a crack in the cathode active material layer 14 or the cathode current collector 11 and the resulting short circuits are be prevented.

Since the electrode laminate of the disclosed embodiments has the above-described structure, the all-solid-state battery comprising the laminate structure composed of a plurality of the electrode laminates, can suppress the phenomenon that stress is locally concentrated inside the laminate structure when the confining pressure of the battery is increased by repeating charge-discharge cycles. Accordingly, such a phenomenon that the surface pressure distribution between the cathode current collector 11 and the cathode active material layer 14 is non-uniform (i.e., non-uniform surface pressure distribution occurs in the interface between the cathode current collector 11 and the cathode active material layer 14) is suppressed. Accordingly, the formation of a Li deposit and the resulting decrease in the durability of the all-solid-state battery are suppressed.

Also, since the electrode laminate of the disclosed embodiments does not employ such a structure that the adhesive portions are formed in the whole region between the cathode current collector 11 and the cathode active material layer 14, an excess increase in the resistance value of the all-solid-state battery, is suppressed.

In the electrode laminate 10 of the first embodiment (see FIGS. 1a and 1b) and the electrode laminate 30 of the third embodiment (FIGS. 3a and 3b), the carbon coat layer 13 is disposed in the region between the cathode current collector 11 and the cathode active material layer 14. Accordingly, by the carbon coat layer 13, adhesion between the cathode active material layer 14 and the current collector portion 16, adhesion between the cathode active material layer 14 and the current collector portion 36, etc., are increased, thereby obtaining high electroconductivity between the cathode current collector 11 and the cathode active material layer 14.

Meanwhile, the electrode laminate 20 of the second embodiment does not comprise a carbon coat layer. Accordingly, the thickness of the electrode laminate and the whole thickness of the laminate structure composed of a plurality of the electrode laminates, are decreased, and production costs are reduced.

For the electrode laminate of the disclosed embodiments, the number of the adhesive portions of the current collector complex may be 1 or more.

For example, as shown in FIGS. 1a to 3b, when the current collector complex comprises a plurality of the adhesive portions, all of the main surfaces of the adhesive portions may be disposed to ensure that the main surface of the current collector portion and all of the main surfaces of the adhesive portions form one flat surface.

The above-described examples show the examples of the electrode laminates, in each of which the cathode active material layer is disposed on the current collector complex comprising the current collector portion that comprises the cathode current collector, and the current collector portion and the cathode active material layer are attached by the adhesive portions. However, the electrode laminate of the disclosed embodiments is not limited to the embodiments shown in FIGS. 1a to 3b.

That is, the electrode laminate of the disclosed embodiments may be the following electrode laminate (not shown), for example: the anode active material layer is disposed on the current collector complex comprising the current collector portion that comprises the anode current collector, and the anode active material layer and the current collector portion are attached by the adhesive portions.

The structure of the electrode laminate in which the anode active material layer is disposed on the current collector complex comprising the current collector portion that comprises the anode current collector, may be the same as the structures of the electrode laminates 10 to 30 shown in FIGS. 1a to 3b, except that the cathode current collector 11 and the cathode active material layer 14 are changed to the anode current collector and the anode active material layer, respectively. Accordingly, the structure of the electrode laminate will not be described here in detail.

Hereinafter, the materials for the electrode laminate for all-solid-state batteries according to the disclosed embodiments, will be described in detail.

The electrode laminate of the disclosed embodiments comprises the active material layer and the current collector complex.

(Active Material Layer)

The active material layer may be the cathode or anode active material layer.

The cathode active material layer comprises at least a cathode active material. As needed, the cathode active material layer comprises an electroconductive material, a binder and a solid electrolyte.

As the cathode active material, a conventionally-known material may be used. As the cathode active material, examples include, but are not limited to, lithium metal (Li), lithium alloys and lithium compounds such as $LiCoO_2$, $LiNi_xCo_{1-x}O_2$ (where $0<x<1$), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), LiCoN, $Li_2SiO_3$ and $Li_4SiO_4$. Examples also includes, but are not limited to, transition metal oxides (such as $V_2O_5$ and $MoO_3$), $TiS_2$, Si, $SiO_2$, and lithium storage intermetallic compounds (such as $Mg_2Sn$, $Mg_2Ge$, $Mg_2Sb$ and $Cu_3Sb$).

As the lithium alloys, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At.

The form of the cathode active material is not particularly limited. As the form of the cathode active material, examples include, but are not limited to, a particulate form and a plate form.

As the solid electrolyte contained in the cathode active material layer, a conventionally-known solid electrolyte may be used, such as an oxide-based solid electrolyte (e.g., $Li_3PO_4$) and a sulfide solid electrolyte produced by mixing $Li_2S$ and $P_2S_5$ at a ratio of 50:50 to 100:0 (e.g., a sulfide solid electrolyte produced by mixing $Li_2S$ and $P_2S_5$ at a mass ratio of 70:30).

The form of the solid electrolyte is not particularly limited. As the form of the solid electrolyte, examples include, but are not limited to, a particulate form and a plate form.

The binder is not particularly limited. As the binder, examples include, but are not limited to, fluorine-containing resin such as polyvinylidene fluoride (PVDF), butadiene rubber (BR) and styrene-butadiene rubber (SBR).

The electroconductive material is not particularly limited. As the electroconductive material, examples include, but are not limited to, metal materials and carbonaceous materials such as acetylene black, Ketjen Black, carbon nanotube and carbon nanofiber.

The carbon nanotube and the carbon nanofiber may be vapor-grown carbon fiber (VGCF).

The thickness of the cathode active material layer is not particularly limited. For example, the thickness of the cathode active material layer may be 0.1 μm or more and 1000 μm or less, or it may be 10 μm or more and 250 μm or less.

The content of the cathode active material in the cathode active material layer is not particularly limited. For example, the content of the cathode material may be from 50 mass % to 90 mass %.

The anode active material layer comprises at least an anode active material. As needed, the anode active material layer comprises an electroconductive material, a binder and a solid electrolyte.

As the anode active material, a conventionally-known material may be used. As the conventionally-known material, examples include, but are not limited to, elemental Li, lithium alloys, carbonaceous materials, elemental Si, Si alloys, and $Li_4Ti_5O_{12}$ (LTO).

As the lithium alloys, examples include, but are not limited to, those exemplified above as the lithium alloys that may be used as the cathode active material.

As the Si alloys, examples include, but are not limited to, alloys with metals such as Li, and alloys with at least one kind of metal selected from the group consisting of Sn, Ge and Al.

The carbonaceous material may be at least one selected from the group consisting of graphite, graphitizable carbon (soft carbon) and non-graphitizable carbon (hard carbon), for example.

The form of the anode active material is not particularly limited. As the form of the anode active material, examples include, but are not limited to, a particulate form and a plate form.

The content of the anode active material in the anode active material layer is not particularly limited. For example, the content of the anode active material may be from 20 mass % to 90 mass %.

As the solid electrolyte used in the anode active material layer, examples include, but are not limited to, those exemplified above as the solid electrolyte that may be used in the cathode active material layer.

As the electroconductive material and binder used in the anode active material layer, examples include, but are not limited to, those exemplified above as the electroconductive material and binder used in the cathode active material layer.

The thickness of the anode active material layer is not particularly limited. For example, the thickness of the anode active material layer may be 0.1 µm or more and 1000 µm or less.

(Current Collector Complex)

The current collector complex comprises the current collector portion and the adhesive portions.

The current collector portion comprises at least the current collector. As needed, the current collector portion may be a laminate of the current collector and the carbon coat layer, in which the carbon coat layer is disposed on at least one surface of the current collector.

The current collector may be the cathode current collector or the anode current collector. When the active material layer is the cathode active material layer, the current collector is the cathode current collector. When the active material layer is the anode active material layer, the current collector is the anode current collector.

The cathode current collector functions to collect current from the cathode active material layer. As the material for the cathode current collector, examples include, but are not limited to, metal materials such as SUS, Ni, Cr, Au, Pt, Al, Fe, Ti and Zn.

As the form of the cathode current collector, examples include, but are not limited to, a foil form, a plate form and a mesh form.

The cathode current collector may include a cathode lead for connection with an external terminal.

The thickness of the cathode current collector is not particularly limited. For example, the thickness of the cathode current collector may be 0.1 µm or more and 1000 µm or less.

The anode current collector functions to collect current from the anode active material layer. As the material for the anode current collector, examples include, but are not limited to, metal materials such as SUS, Cu, Ni, Fe, Ti, Co and Zn. As the form of the anode current collector, examples include, but are not limited to, a foil form, a plate form and a mesh form.

The anode current collector may include an anode lead for connection with an external terminal.

The thickness of the anode current collector is not particularly limited. For example, the thickness of the anode current collector may be 0.1 µm or more and 1000 µm or less.

The carbon coat layer comprises at least a carbonaceous material. As needed, the carbon coat layer comprises a binder.

As the carbonaceous material contained in the carbon coat layer, examples include, but are not limited to, graphite powder and carbon black such as acetylene black, furnace black and Ketjen Black.

As the binder contained in the carbon coat layer, examples include, but are not limited to, those exemplified above as the binder contained in the cathode active material layer.

The content of the carbonaceous material contained in the carbon coat layer, is not particularly limited. For example, the content of the carbonaceous material may be from 10 mass % to 90 mass %. The content of the binder in the carbon coat layer is not particularly limited. The content of the binder may be from 10 mass % to 90 mass %.

As the carbon coat layer, for example, a carbon coat layer containing 15 mass % of the carbonaceous material and 85 mass % of the binder, may be used.

The thickness of the carbon coat layer is not particularly limited. For example, the thickness of the carbon coat layer may be 5 µm or more and 50 µm or less, or it may be 10 µm.

The volume resistivity of the carbon coat layer may be from $1 \times 10^3$ Ωcm to $10 \times 10^3$ Ωcm. For example, the volume resistivity of the carbon coat layer may be $5 \times 10^3$ Ωcm.

The adhesive portions comprises at least a resin.

As the resin used in the adhesive portions, such a thermoplastic resin that the melting or softening point is equal to or less than the deterioration temperatures of the battery materials, may be used. As the thermoplastic resin used in the adhesive portions, examples include, but are not limited to, polyolefin-based resin, low density polyethylene (LDPE) and ethylene-vinyl acetate copolymer resin (EVA).

As the thermoplastic resin used in the adhesive portions, examples include, but are not limited to, an ethylene-vinyl acetate copolymer resin manufactured by Hitachi Chemical Co., Ltd.

The resin used in the adhesive portions may be selected from resins that are allowed to obtain attachable resin viscosity at temperatures equal to or less than the deterioration temperature of the battery materials, considering the temperature dependency of the resins.

As the adhesive portions, for example, the above-described thermoplastic resin may be applied to form resin layers, and the resin layers may be dried and used as the adhesive portions. However, the adhesive portions are not limited to this embodiment. For example, a commercially-available, double-sided adhesive tape may be cut into pieces, and the tape pieces may be used as the adhesive portions, or a commercially-available adhesive may be applied to form layers, and the adhesive layers may be dried and used as the adhesive portions.

The thickness of the adhesive portions is not particularly limited, as long as the active material layer-side main surface of the current collector portion and the active material layer-side main surfaces of the adhesive portions are formed to be one flat surface.

2. Method for Producing an Electrode Laminate for all-Solid-State Batteries

The method for producing an electrode laminate for all-solid-state batteries according to the disclosed embodiments, is a method for producing an electrode laminate for all-solid-state batteries, the method comprising:

forming a current collector complex comprising adhesive portions and a current collector portion that comprises at least a current collector, wherein a main surface of the current collector portion and main surfaces of the adhesive portions are formed to be one flat surface (a current collector complex forming step), and attaching the current collector portion and an active material layer by the adhesive portions by forming the active material layer on a main surface of the current collector complex, which is a main surface on a side where the adhesive portions are exposed (an attaching step).

The electrode laminate production method of the disclosed embodiments comprises (1) a current collector complex forming step and (2) an adhering step. As needed, it comprises (3) a pressing step.

(1) Current Collector Complex Forming Step

The current collector complex forming step is a step of forming a current collector complex comprising adhesive portions and a current collector portion that comprises at least a current collector, wherein a main surface of the current collector portion and main surfaces of the adhesive portions are formed to be one flat surface.

Hereinafter, (1A) an example of the current collector complex forming step of the first and second embodiments and (1B) an example of the current collector complex forming step of the third embodiment, will be described in order.

(1A) First and Second Embodiments

The current collector complex forming step of the electrode laminate production method of the first embodiment and that of the second embodiment, may comprise (1-1) a concavity forming step and (1-2) a first adhesive portion forming step.

Figure 4:
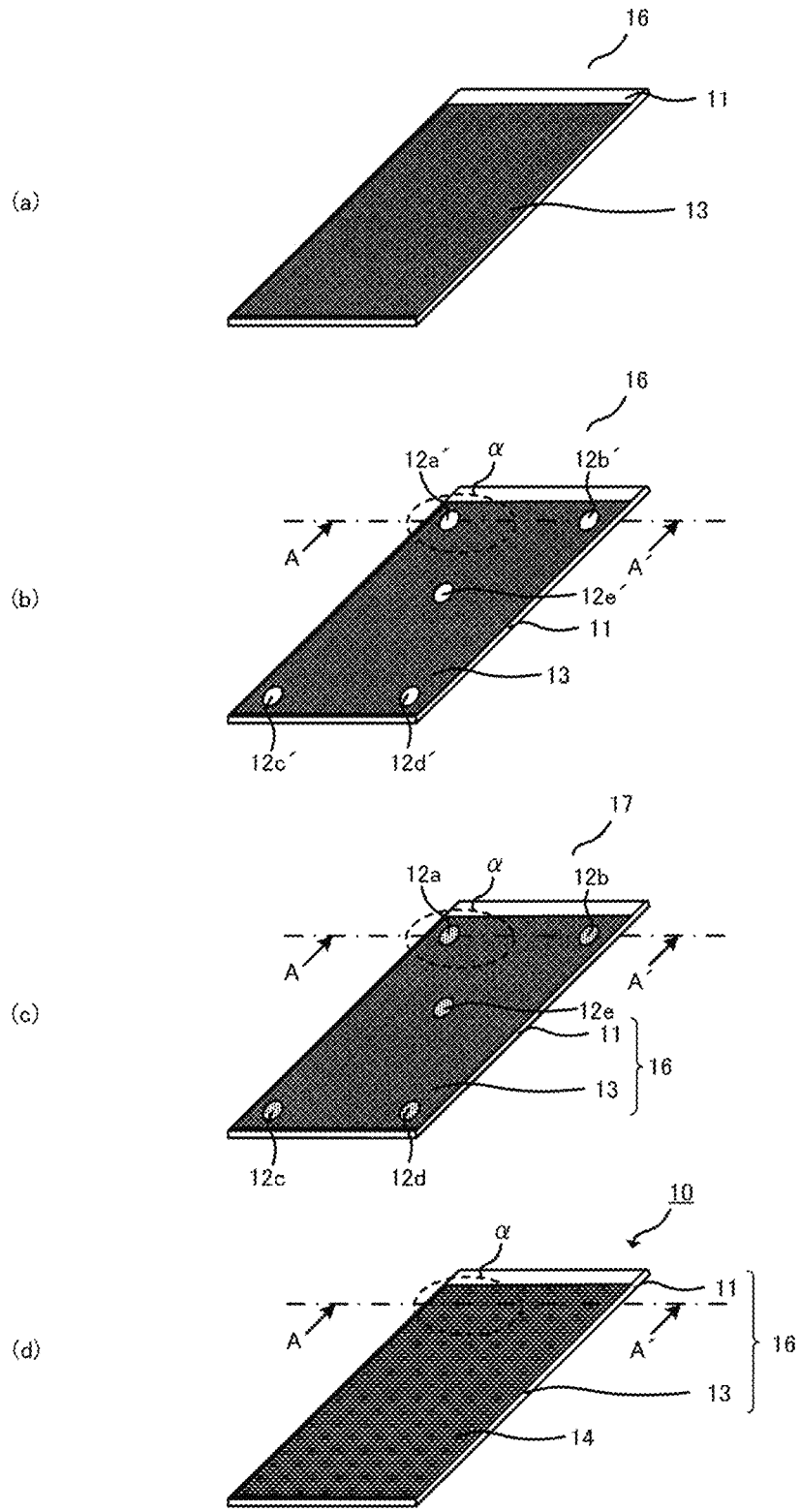
FIG. 4 shows perspective views (a) to (d) schematically illustrating the steps of an example of a method for producing the electrode laminate 10 shown in FIGS. 1a and 1b.
Figure 5:
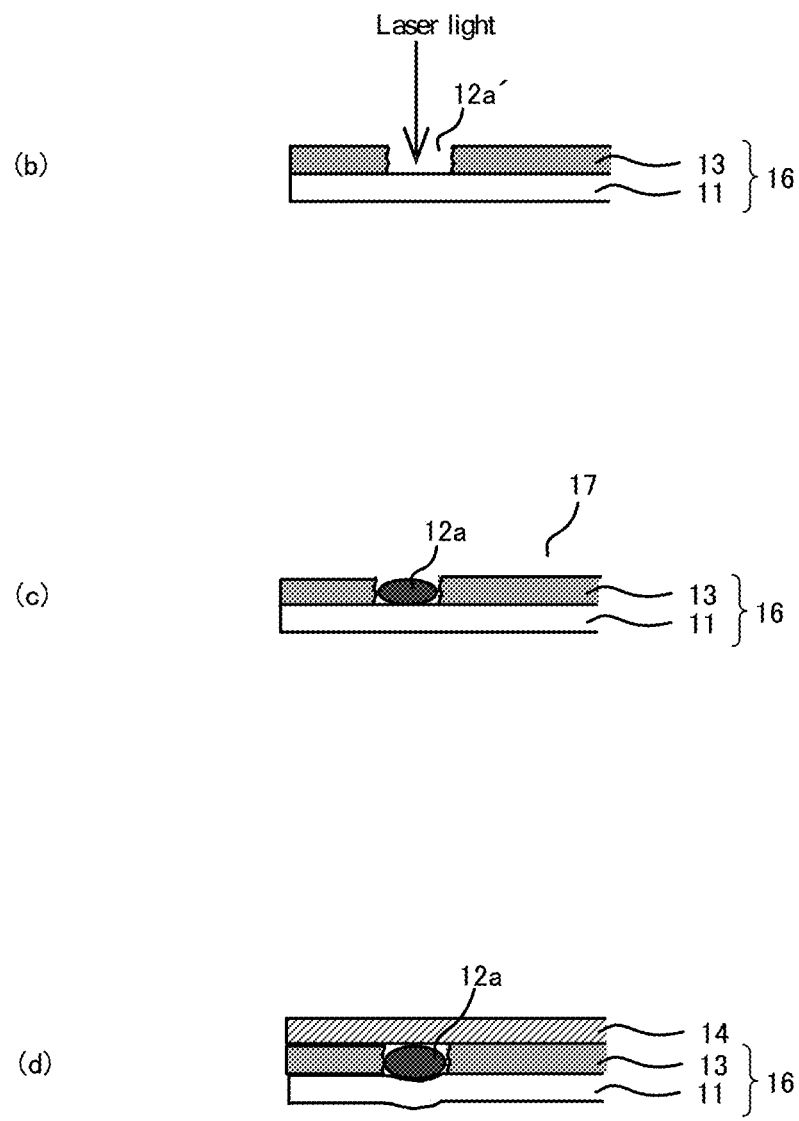
FIG. 5 shows sectional views (b) to (d) along A-A' line for the steps shown in the perspective views (b) to (d) of FIG. 4.

FIG. 4 shows perspective views (a) to (d) schematically illustrating the steps of an example of a method for producing the electrode laminate 10 according to the first embodiment. FIG. 5 shows sectional views (b) to (d) along A-A' line for the steps shown in the perspective views (b) to (d) of FIG. 4. The sectional view (b) of FIG. 5 is a sectional view of a region α shown in the perspective view (b) of FIG. 4. The sectional view (c) of FIG. 5 is a sectional view of the region α shown in the perspective view (c) of FIG. 4. The sectional view (d) of FIG. 5 is a sectional view of the region α shown in the perspective view (d) of FIG. 4.

Figure 6:
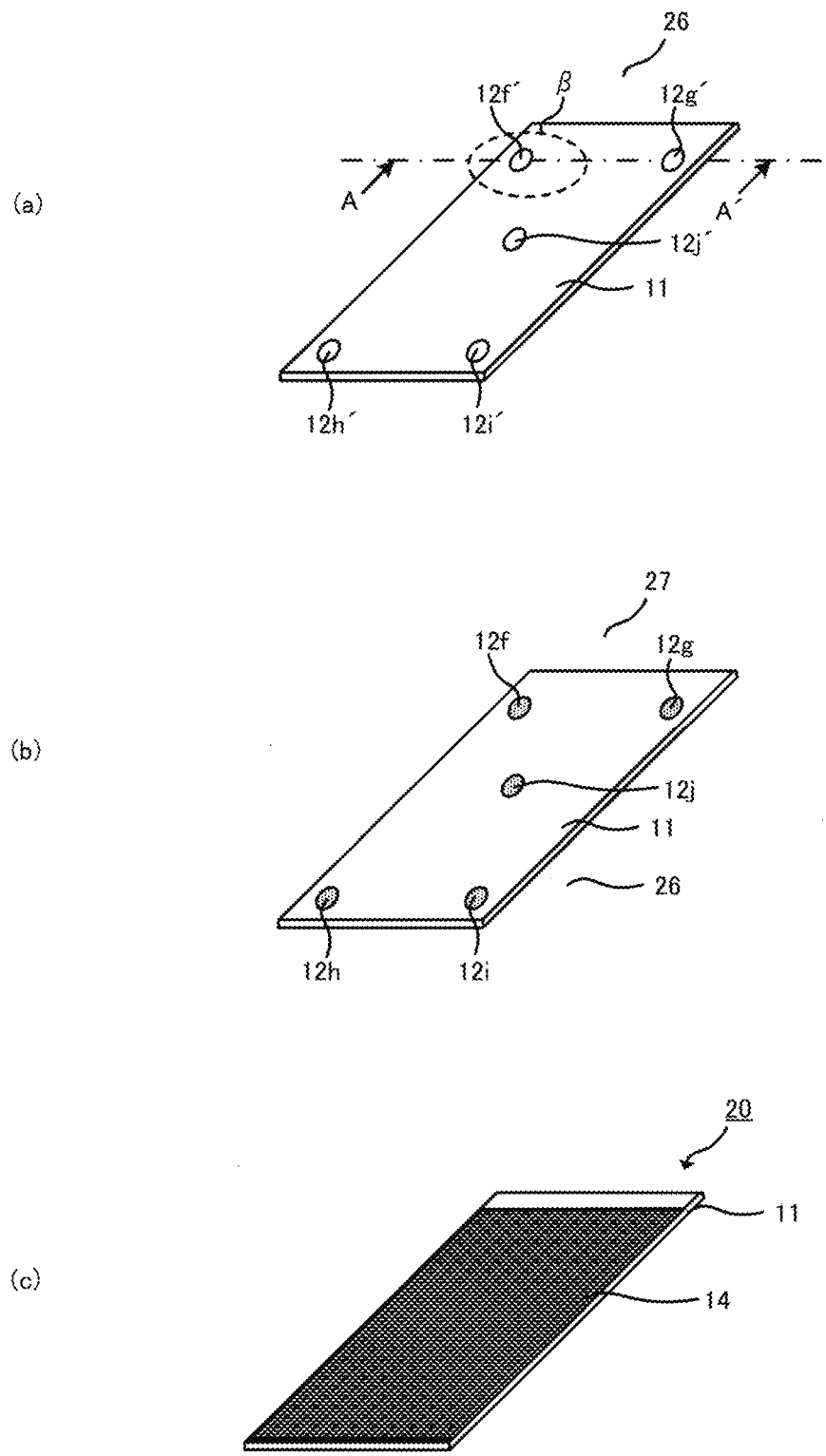
FIG. 6 shows perspective views (a) to (c) schematically illustrating the steps of an example of a method for producing the electrode laminate 20 shown in FIGS. 2a and 2b.

FIG. 6 shows perspective views (a) to (c) schematically illustrating the steps of an example of a method for producing the electrode laminate 20 according to the second embodiment.

Figure 7:
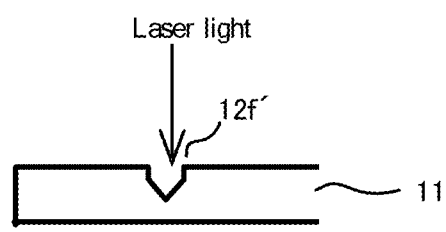
FIG. 7 is a sectional view along A-A' line for a region 1 shown in the perspective view (a) of FIG. 6.

FIG. 7 is a sectional view along A-A' line for a region R shown in the perspective view (a) of FIG. 6.

(1-1) Concavity Forming Step

The concavity forming step is a step of forming concavities, which are used to form the adhesive portions, on a surface of the current collector portion, which is a surface on which the active material layer will be disposed (see the perspective view (b) of FIG. 4 and the perspective view (a) of FIG. 6).

The current collector portion with the concavities may be the laminate of the current collector and the carbon coat layer (see the perspective view (b) of FIG. 4) or may be the current collector portion itself (see the perspective view (a) of FIG. 6).

In the case of using the laminate of the current collector and the carbon coat layer as the current collector portion, the carbon coat layer may be formed on the current collector as follows, for example.

First, a composition for forming the carbon coat layer, which contains a carbonaceous material and a binder, is made into slurry. The slurry is applied on the cathode current collector 11. The applied slurry is dried, thereby forming the carbon coat layer 13 (see the perspective view (a) of FIG. 4).

The carbonaceous material and binder contained in the composition for forming the carbon coat layer, may be selected from those exemplified above as the materials for forming the carbon coat layer.

The position for forming the carbon coat layer 13 is not particularly limited. For example, as shown in the perspective view (a) of FIG. 4, the carbon coat layer 13 may be formed as a layer coating one surface of the cathode current collector 11, while a region on one of the end edge sides in the longitudinal direction of the cathode current collector 11, is left uncoated.

In the step shown in the perspective view (a) of FIG. 4, the carbon coat layer 13 may be formed to ensure that, when the cathode current collector 11 is viewed from above, a region of the main surface of the cathode current collector 11, which is a region that overlaps with the cathode active material layer 14 formed in "(2) Attaching step" described below (see the perspective view (d) of FIG. 4), is wholly coated with the carbon coat layer 13 and the adhesive portions 12a to 12e formed in "(1-2) First adhesive portion forming step" described below (see the perspective view (c) of FIG. 4).

The method for forming the concavities on the current collector portion, is not particularly limited. For example, the concavities may be formed by applying laser light to the positions where the concavities are expected to be formed.

As the laser light, for example, an ultrashort pulse laser with a pulse width of $10^{-9}$ seconds or less, may be used.

As the ultrashort pulse laser, a nanosecond pulse laser ($1\times10^{-9}$), a picosecond pulse laser ($1\times10^{-12}$) or a femtosecond pulse laser ($1\times10^{-15}$) may be used.

In the case of using the femtosecond pulse laser, concavities with a desired thickness and a desired depth can be formed at desired positions of the current collector portion, irrespective of the properties of the materials for the current collector portion, which is the target of the laser application.

The wavelength, output value and frequency of the laser light may be appropriately controlled depending on the diameter of pores formed by the laser application, the thickness of the current collector portion, and/or the properties of the materials.

The concavities for forming the adhesive portions are formed on one surface of the current collector portion, which is the surface on the side where the active material layer is disposed.

In the case of forming the concavities in the current collector portion (the laminate of the current collector and the carbon coat layer), for example, as shown in the perspective views of FIG. 4, first, the carbon coat layer 13 is formed on the cathode current collector 11, thereby producing the current collector portion 16 (see the perspective view (a) of FIG. 4). Laser light is applied to the carbon coat layer 13 to form the concavities 12a' to 12e' (see the perspective view (b) of FIG. 4 and the sectional view (b) of FIG. 5). At this time, as shown in the sectional view (b) of FIG. 5, through holes may be formed in the carbon coat layer. Also at this time, concavities may be formed in a part of the cathode current collector 11 present beneath the through holes formed in the carbon coat layer 13, to the extent that through holes are not formed in the cathode current collector 11.

In the case of forming the concavities in the current collector portion composed of the current collector itself, for example, as shown in FIG. 7, the concavities 12f' to 12j' having a predetermined depth are formed by applying laser light to the other main surface of the cathode current collector 11, ensuring that the applied laser light penetrates the cathode current collector 11 (see the perspective view (a) of FIG. 6).

The method for forming the concavities on the current collector portion, is not limited to the above-described laser application. For example, the concavities may be formed by engraving the surface of the current collector portion by bringing the tip of a needle-shaped member, etc., into contact with the positions where the concavities are expected to be formed on the active material layer-side main surface of the current collector portion.

The positions where the concavities are formed, is not particularly limited. For example, as shown in the perspective view (b) of FIG. 4 and the perspective view (a) of FIG. 6, the concavities may be formed at the four corners and center of the above-described surface of the current collector portion, which is the surface on the side where the active material layer is disposed.

The positions for forming the concavities are not limited to the above-described positions. They may be formed at desired positions of the main surface of the current collector portion, which is the main surface on the side where the active material layer is disposed.

As described above, by employing the method of applying the laser light to the current collector portion as the method for forming the concavities for forming the adhesive portions, a desired number of concavities can be formed at desired positions of the current collector portion.

Accordingly, the concavities can be formed on the current collector portion by appropriately controlling the positions and number of the concavities formed, depending on the adhesion required of each electrode laminate. Accordingly, a decrease in effective power generation area due to the presence of the adhesive portions, can be minimized.

(1-2) First Adhesive Portion Forming Step

The first adhesive portion forming step is a step of filling the concavities with the composition for forming the adhesive portions.

More specifically, the adhesive portions composed of the solidified composition product, may be formed by filling the concavities formed in "(1-1) Concavity forming step" with the composition for forming the adhesive portions, which contains the above-described thermoplastic resin, etc., and solidifying the composition filling the concavities (see the perspective view (c) of FIG. 4 and the perspective view (b) of FIG. 6).

As the resin component contained in the composition for forming the adhesive portions, such as the thermoplastic resin, may be selected from those exemplified above as the resin material for the adhesive portions.

The concavities may be filled with the composition for forming the adhesive portions by a conventionally-known filling method.

In the case of forming a plurality of the adhesive portions, the main surfaces of the adhesive portions and the main surface of the current collector portion are formed to be one flat surface.

For example, as shown in the perspective views of FIG. 4, in the case of using the current collector portion 16 composed of the laminate of the cathode current collector 11 and the carbon coat layer 13 as the current collector portion, the main surfaces of the adhesive portions 12a to 12e formed in at least a part of the carbon coat layer 13 and the main surface of the current collector portion 16 (that is, the main surface of the carbon coat layer 13) are formed to be one flat surface (see the perspective view (c) of FIG. 4). Accordingly, the current collector complex 17 is obtained. In this case, the adhesive portions 12a to 12e are formed to ensure that the adhesive portions 12a to 12e and the carbon coat layer 13 are continuously disposed, without allowing a space to be formed between the adhesive portions 12a to 12e and the carbon coat layer 13.

For example, as shown in the perspective views (a) to (c) of FIG. 6, in the case of using the current collector portion 26 composed of the cathode current collector 11 itself, the main surfaces of the adhesive portions 12f to 12j formed in a part of the cathode current collector 11 and the main surface of the current collector portion 26, that is, the main surface of the cathode current collector 11, are formed to be one flat surface (see the perspective view (b) of FIG. 6). Accordingly, the current collector complex 27 is formed. In this case, the adhesive portions 12f to 12j are formed to ensure that the adhesive portions 12f to 12j and the cathode current collector 11 are continuously disposed, without allowing a space to be formed between the adhesive portions 12f to 12j and the cathode current collector 11.

That is, the adhesive portions 12a to 12j are formed to ensure that the main surfaces of the adhesive portions 12a to 12j are adjacent to the main surface of the current collector portion 11, which is the main surface on the side where the cathode active material layer 14 is disposed, to form a continuous plane.

More specifically, the concavities may be absolutely and densely filled with the composition for forming the adhesive portions.

(1B) Third Embodiment

The current collector complex forming step of the electrode laminate production method of the third embodiment, may comprise (1-3) a carbon coat layer forming step and (1-4) a second adhesive portion forming step.

Figure 8:
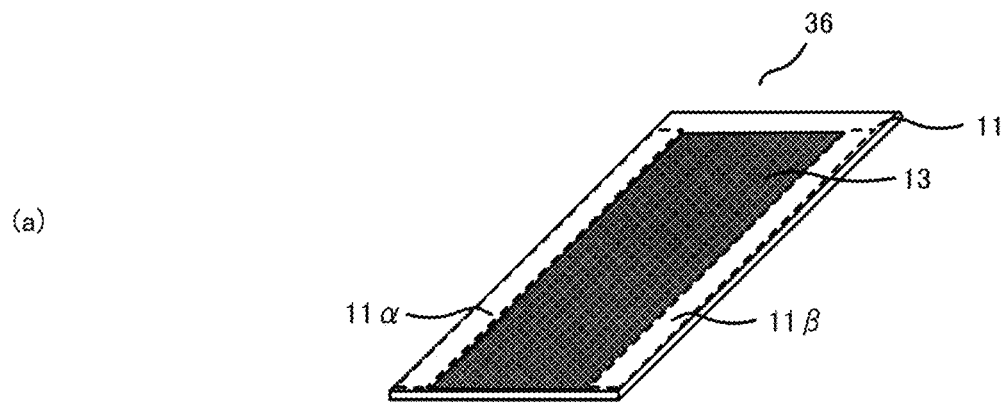
FIG. 8 shows perspective views (a) to (c) schematically illustrating the steps of an example of a method for producing the electrode laminate 30 shown in FIGS. 3a and 3b.
Figure 8:
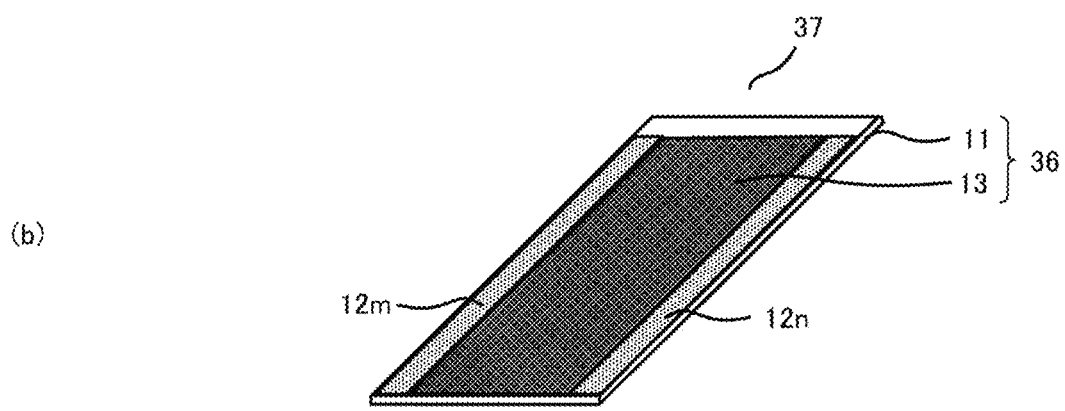
Figure 8:
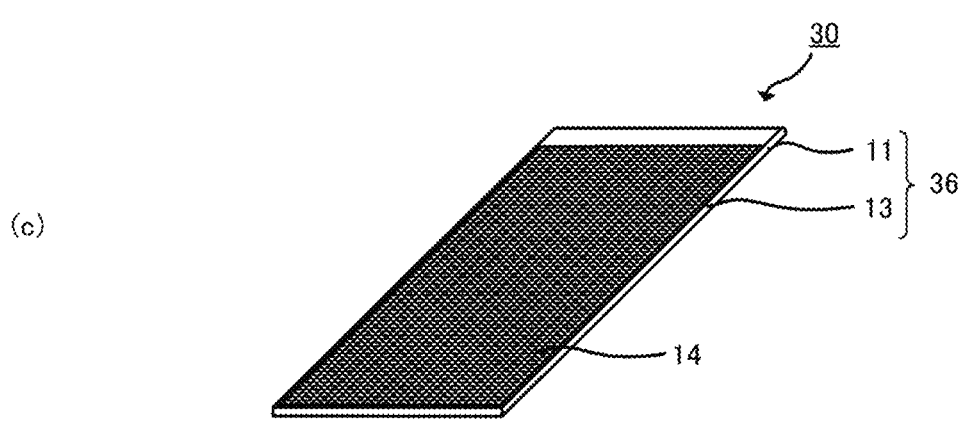

FIG. 8 shows perspective views (a) to (c) schematically illustrating the steps of an example of a method for producing the electrode laminate 30 shown in FIGS. 3a and 3b.

With reference to the perspective views (a) to (c) of FIG. 8, the electrode laminate production method of the third embodiment will be described.

(1-3) Carbon Coat Layer Forming Step

The carbon coat layer forming step is a step of producing the current collector portion comprising the current collector and the carbon coat layer by forming the carbon coat layer on at least one surface of the current collector (see the perspective view (a) of FIG. 8).

The carbon coat layer may be formed by use of the same composition as the composition for forming the carbon coat layer described above in the step (1-1).

In the step (1-3), the position for forming the carbon coat layer 13 is not particularly limited. For example, as shown in the perspective view (a) of FIG. 8, the carbon coat layer 13 may be formed at the center in the width direction of the main surface of the cathode current collector 11, as a belt-shaped layer extending in the longitudinal direction of the cathode current collector 11.

(1-4) Second Adhesive Portion Forming Step

The second adhesive portion forming step is a step of forming the adhesive portions on one surface of the current collector, which is the surface on the side where the carbon coat layer is formed.

In the second adhesive portion forming step, the adhesive portions 12m and 12n in layer form may be formed by applying the composition for forming the adhesive portions on the cathode current collector 11 (see the perspective view (b) of FIG. 8). Accordingly, the current collector complex 37 is obtained.

As the composition for forming the adhesive portions, the same composition as the composition for forming the adhesive portions used in the above-described "(1-2) First adhesive portion forming step" may be used.

The positions for forming the adhesive portions are not particularly limited. However, the adhesive portions are formed to ensure that the adhesive portions and the carbon coat layer 13 are continuously disposed, without allowing a space to be formed between the adhesive portions and the carbon coat layer 13. The adhesive portions may be wholly disposed on a region of the main surface of the cathode current collector 11, on which the carbon coat layer 13 is not disposed.

For example, as shown in the perspective view (a) of FIG. 8, in the case of forming the carbon coat layer 13 at the center in the width direction of the cathode current collector 11, the adhesive portions may be formed in regions on both end edges in the width direction of the main surface of the cathode current collector 11, on each of which the carbon coat layer 13 is not disposed (i.e., regions 11 and 111 shown in the perspective view (a) of FIG. 8), as a pair of layers extending in the longitudinal direction of the cathode current collector 11.

The adhesive portions 12m and 12n are formed to ensure that the main surfaces thereof and the main surface of the carbon coat layer 13, which is the main surface of the current collector portion 36, are formed to be one flat surface.

Also, the adhesive portions 12m and 12n are formed to ensure that the main surfaces of the adhesive portions 12m and 12n are adjacent to the main surface of the carbon coat layer 13 to form a continuous plane.

This structure may be formed by, for example, setting the thickness of the adhesive portions 12m and 12n to the same thickness as the carbon coat layer 13.

In the step shown in the perspective view (b) of FIG. 8, the adhesive portions 12m and 12n may be formed to ensure that, when the cathode current collector 11 is viewed from above, a region of the main surface of the cathode current collector 11, which is a region that overlaps with the cathode active material layer 14 formed in "(2) Attaching step" described below (see the perspective view (c) of FIG. 8), is wholly coated with the adhesive portion 12m, the adhesive portion 12n and the carbon coat layer 13.

(2) Attaching Step

The attaching step is a step of attaching the current collector portion and the active material layer by the adhesive portions by forming the active material layer on the main surface of the current collector complex, on which the adhesive portions are exposed.

In the attaching step, for example, the cathode active material layer may be formed as follows on the current collector complex: a composition for forming the cathode active material layer, which contains a cathode active material, a solid electrolyte, a binder and, as needed, an electroconductive material, is made into slurry; the slurry is applied to a surface of the current collector complex, which is the surface on the side where the adhesive portions are exposed; and the applied slurry is dried, thereby forming the cathode active material layer on the current collector complex.

Accordingly, the current collector portion and the active material layer are attached by the adhesive portions, thereby obtaining the electrode laminate (see the perspective view (d) of FIG. 4, the perspective view (c) of FIG. 6, and the perspective view (c) of FIG. 8).

The cathode active material, solid electrolyte, binder and electroconductive material contained in the composition for forming the cathode active material layer, may be selected from those exemplified above as the materials for the cathode active material layer.

More specifically, in an example of the first embodiment shown in the perspective views (a) to (d) of FIG. 4, the electrode laminate 10 may be obtained by forming the cathode active material layer 14 on the main surface of the carbon coat layer 13, that is, the main surface of the current collector complex 17, which is the main surface on the side where the adhesive portions 12a to 12e are exposed (see the perspective view (c) of FIG. 4), and attaching the current collector portion 16 and the cathode active material layer 14 by the adhesive portions 12a to 12e (see the perspective view (d) of FIG. 4).

In an example of the second embodiment shown in the perspective views (a) to (c) of FIG. 6, the electrode laminate 20 may be obtained by forming the cathode active material layer 14 on the main surface of the current collector complex 27, which is the main surface on the side where the adhesive portions 12f to 12j are exposed (that is, the main surface of the cathode current collector 11, which is the main surface on the side where the adhesive portions 12f to 12j are exposed) (see the perspective view (b) of FIG. 6), and attaching the current collector portion 26 and the cathode active material layer 14 by the adhesive portions 12f to 12j (see the perspective view (c) of FIG. 6).

In an example of the third embodiment shown in the perspective views (a) to (c) of FIG. 8, the electrode laminate 30 may be obtained by forming the cathode active material layer 14 on the main surface of the current collector complex 37, which is the main surface on the side where the adhesive portions 12m and 12n are exposed (see the perspective view (b) of FIG. 8), and attaching the current collector portion 36 and the cathode active material layer 14 by the adhesive portions 12m and 12n (see the perspective view (c) of FIG. 8).

(3) Pressing Step

The pressing step is a step of pressing the electrode laminate produced in "(2) Attaching step" in the laminating direction (not shown). In the pressing step, the method for pressing the electrode laminate is not particularly limited, and the electrode laminate may be pressed by a known method. In the pressing step, the electrode laminate may be pressed while heating the electrode laminate.

The method for pressing the electrode laminate is not particularly limited. For example, mechanical pressurization or gas pressurization may be used.

As the mechanical pressurization, examples include, but are not limited to, pressing the electrode laminate in the laminating direction through a ball screw by driving a motor, and pressing the electrode laminate in the laminating direction through hydraulic pressure by driving a motor. At this time, applied pressure is increased or decreased to a desired pressure, and then the operating section of a pressing machine is fixed by use of a mechanical stopper, whereby energy consumption required to drive the motor can be minimized.

As the gas pressurization, examples include, but are not limited to, pressing the electrode laminate through pressurized gas supplied from a gas cylinder, etc.

In the pressing step, the pressure applied to the electrode laminate may be 1 MPa, and the heating temperature may be 140° C., for example.

The examples shown in the perspective views of FIGS. 4 to 8, are examples showing the method for obtaining the electrode laminate by forming the cathode active material layer on the main surface of the current collector complex comprising the current collector portion that comprises the cathode current collector, which is the main surface on the side where the adhesive portions are exposed. However, the electrode laminate production method of the disclosed embodiments may be a method for obtaining the electrode laminate by forming the anode active material layer on the main surface of the current collector complex comprising the current collector portion that comprises the anode current collector, which is the main surface on the side where the adhesive portions are exposed.

In the case of the latter, the electrode laminate may be obtained in the same manner as described above with reference to the perspective views of FIGS. 4 to 8, except that the anode current collector is used in place of the cathode current collector 11, and a composition for forming the anode active material layer, which contains an anode active material, a solid electrolyte, a binder and, as needed, an electroconductive material, is used in place of the composition for forming the cathode active material layer.

The anode active material, solid electrolyte, binder and electroconductive material contained in the composition for forming the anode active material layer may be selected from those exemplified above as the materials for the anode active material layer.

3. All-Solid-State Battery

3-1. First Embodiment

Figure 9:
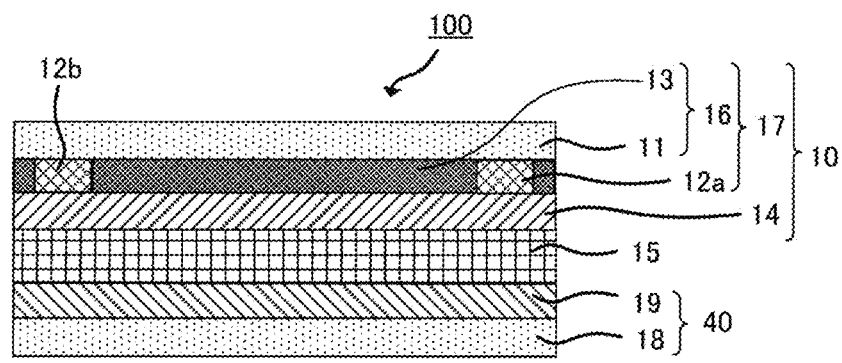
FIG. 9 is a schematic sectional view of an example of an all-solid-state battery 100 comprising the electrode laminate 10 of the first embodiment.

FIG. 9 is a schematic sectional view of an example of an all-solid-state battery 100 comprising the electrode laminate 10 of the first embodiment.

The all-solid-state battery 100 comprises a cathode-side electrode laminate 10, an anode-side electrode laminate 40, and the solid electrolyte layer 15 disposed between the cathode-side electrode laminate 10 and the anode-side electrode laminate 40. The cathode-side electrode laminate 10 comprises the current collector complex 17 and the cathode active material layer 14 disposed on the current collector complex 17, in which the current collector complex 17 comprises the current collector portion 16 and the adhesive portions 12a to 12e; the current collector portion 16 comprises the cathode current collector 11 and the carbon coat layer 13; and the adhesive portions 12a to 12e are formed in a part of the carbon coat layer 13. The anode-side electrode laminate 40 comprises the anode active material layer 19 and the anode current collector 18.

The cathode-side electrode laminate 10 of the all-solid-state battery 100 will not be described here, since it is the electrode laminate for all-solid-state batteries according to the first embodiment (see FIGS. 1a and 1b).

3-2. Second Embodiment

Figure 10:
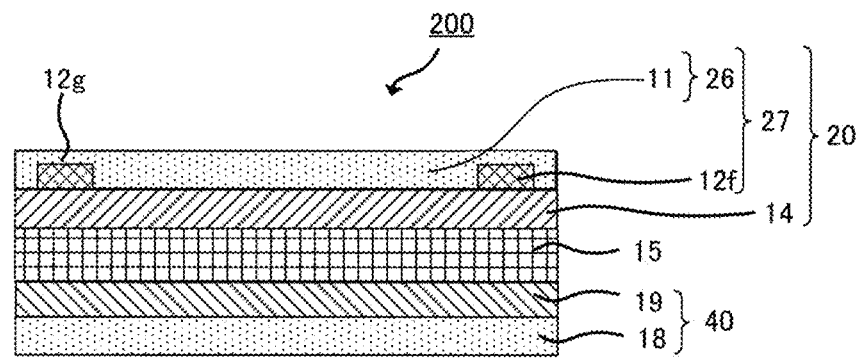
FIG. 10 is a schematic sectional view of an example of an all-solid-state battery 200 comprising the electrode laminate 20 of the second embodiment.

FIG. 10 is a schematic sectional view of an example of an all-solid-state battery 200 comprising the electrode laminate 20 of the second embodiment.

The all-solid-state battery 200 is the same as the all-solid-state battery 100 shown in FIG. 9, except that a cathode-side electrode laminate 20 shown in FIGS. 2a and 2b is used in place of the cathode-side electrode laminate 10.

The cathode-side electrode laminate 20 of the all-solid-state battery 200 will not be described here, since it is the electrode laminate for all-solid-state batteries 20 according to the second embodiment (see FIGS. 2a and 2b).

3-3. Third Embodiment

Figure 11:
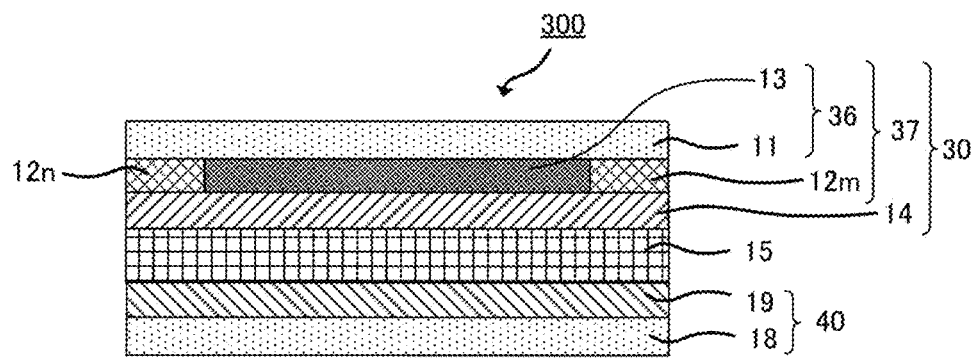
FIG. 11 is a schematic sectional view of an example of an all-solid-state battery 300 comprising the electrode laminate 30 of the third embodiment.

FIG. 11 is a schematic sectional view of an example of an all-solid-state battery 300 comprising the electrode laminate 30 of the third embodiment.

The all-solid-state battery 300 is the same as the all-solid-state battery 100 shown in FIG. 9, except that a cathode-side electrode laminate 30 shown in FIGS. 3a and 3b is used in place of the cathode-side electrode laminate 10.

The cathode-side electrode laminate 30 of the all-solid-state battery 300 will not be described here, since it is the electrode laminate for all-solid-state batteries 30 according to the third embodiment (see FIGS. 3a and 3b).

As the anode active material layer of the anode-side electrode laminate 40 of the all-solid-state batteries 100 to 300, the above-described anode active material layer that may be used as the active material layer of the electrode laminate for all-solid-state batteries according to the disclosed embodiments, may be used.

As the anode current collector of the anode-side electrode laminate 40 of the all-solid-state batteries 100 to 300, the above-described anode current collector that may be used as the current collector of the electrode laminate for all-solid-state batteries according to the disclosed embodiments, may be used.

The solid electrolyte layer of the all-solid-state battery of the disclosed embodiments comprises at least a solid electrolyte. As needed, the solid electrolyte layer may comprise a binder, etc.

As the solid electrolyte used in the solid electrolyte layer, a conventionally-known solid electrolyte that is applicable to all-solid-state batteries, may be used without any particular limitation. For example, the solid electrolyte may be selected from those exemplified above as the solid electrolyte that may be used in the above-described cathode or anode active material layer.

The form of the solid electrolyte is not particularly limited. As the form, examples include, but are not limited to, a particulate form and a plate form.

The binder used in the solid electrolyte layer may be selected from those exemplified above as the binder used in the above-described cathode active material layer.

The thickness of the solid electrolyte layer varies depending on the type of the electrolyte, the structure of the battery, etc., and it is not particularly limited. For example, the thickness of the solid electrolyte layer may be in a range of from 0.1 µm to 1000 µm, or it may be in a range of from 0.1 µm to 300 µm.

As needed, the all-solid-state battery of the disclosed embodiments comprises an outer casing for housing the cathode-side electrode laminate, the anode-side electrode laminate and the solid electrolyte.

The material for the outer casing is not particularly limited, as long as it is a material that is stable in electrolytes. As the material, examples include, but are not limited to, resins such as polypropylene, polyethylene and acrylic resin.

As needed, the all-solid-state battery of the disclosed embodiments may comprise a confining member for confining the laminate structure comprising the cathode-side electrode laminate, the anode-side electrode laminate and the solid electrolyte layer by pressing the laminate structure in the laminating direction.

When the all-solid-state battery of the disclosed embodiments is used as a power source, pressure is applied to the electrode portions, each of which is a region where the cathode and anode active material layers are present, of the all-solid-state battery. The pressure may be 1 MPa or more and 45 MPa or less. Pressure is also applied to the electrode portion when the battery is not in use. The pressure may be 0 MPa or more and 1 MPa or less.

As the all-solid-state battery, examples include, but are not limited to, a lithium battery, a sodium battery, a magnesium battery and a calcium battery. The all-solid-state battery may be a lithium battery.

As the form of the all-solid-state battery comprising the electrode laminate of the disclosed embodiments, examples include, but are not limited to, a coin form, a laminate form, a cylindrical form and a square form.

The all-solid-state battery comprising the electrode laminate of the disclosed embodiments, may be a primary or secondary battery. The all-solid-battery may be a secondary battery, since it can be repeatedly charged and discharged and is useful as a car battery, for example.

In the case of using the all-solid-state battery comprising the electrode laminate of the disclosed embodiments as a car battery, it can be equipped in vehicles such as an electric vehicle in which a battery is equipped in place of an engine, and a hybrid vehicle in which both a battery and an engine are equipped.

The all-solid-state batteries 100 to 300 shown in FIGS. 9 to 11 are examples comprising electrode laminates 10 to 30 in which the cathode active material layer is formed on the current collector complex comprising the current collector portion that comprises the cathode current collector, and the cathode active material layer and the current collector portion are attached by the adhesive portions. However, the all-solid-state battery of the disclosed embodiments is not limited to them. That is, the all-solid-state battery of the disclosed embodiments may be a structure comprising the electrode laminate in which the anode active material layer is formed on the current collector complex comprising the current collector portion that comprises the anode current collector, and the anode active material layer and the current collector portion are attached by the adhesive portions.

4. Method for Producing an all-Solid-State Battery 4-1. First Embodiment

The all-solid-state battery 100 of the first embodiment shown in FIG. 9 can be produced by the following steps, for example.

First, the cathode-side electrode laminate 10 (see the perspective view (d) of FIG. 4) is produced in the same manner as the current collector complex forming step and attaching step described above in "2. Method for producing an electrode laminate for all-solid-state batteries". The cathode-side electrode laminate 10 comprises the current collector complex 17 and the cathode active material layer 14 disposed on the current collector complex 17, in which the current collector complex 17 comprises the current collector portion 16 and the adhesive portions 12*a* to 12*e*; the current collector portion 16 comprises the cathode current collector 11 and the carbon coat layer 13; and the adhesive portions 12*a* to 12*e* are formed in a part of the carbon coat layer 13.

Next, the composition for forming the anode active material layer, which contains the anode active material, the solid electrolyte, the binder and, as needed, the electroconductive material, is made into slurry. The slurry is applied on the anode current collector 18. The applied slurry is dried, thereby forming the anode active material layer 19. Accordingly, an assembly (not shown) comprising the anode active material layer 19 and the anode current collector 18, is produced.

The anode active material, solid electrolyte, binder and electroconductive material contained in the composition for forming the anode active material layer, may be selected from those exemplified above as the materials for the anode active material layer.

Next, a composition for forming the solid electrolyte layer, which contains a solid electrolyte and a binder, is applied to the cathode active material layer 14 and to the anode active material layer 19, thereby disposing a part of the solid electrolyte layer 15 on the cathode active material layer 14 and on the anode active material layer 19. Then, the cathode active material layer 14 and the anode active material layer 19 are disposed on each other to ensure that a part of the solid electrolyte layer 15 of the cathode active material layer 14 and a part of the solid electrolyte layer 15 of the anode active material layer 19, overlap with each other. As needed, the thus-obtained laminate structure is pressed in the laminating direction, thereby producing the all-solid-state battery 100 of the first embodiment, comprising the laminate structure in which the cathode current collector 11, the carbon coat layer 13, the cathode active material layer 14, the solid electrolyte layer 15, the anode active material layer 19 and the anode current collector 18 are disposed in this order.

The pressing method and condition may be the same as those described above in "(3) Pressing step".

4-2. Second Embodiment

The all-solid-state battery 200 of the second embodiment shown in FIG. 10 can be produced by the following steps, for example.

First, the cathode-side electrode laminate 20 (see the perspective view (c) of FIG. 6) is produced in the same manner as the current collector complex forming step and attaching step described above in "2. Method for producing an electrode laminate for all-solid-state batteries". The cathode-side electrode laminate 20 comprises the current collector complex 27 and the cathode active material layer 14 disposed on the current collector complex 27, in which the current collector complex 27 comprises the current collector portion 26 and the adhesive portions 12*f* to 12*j*; the current collector portion 26 comprises the cathode current collector 11; and the adhesive portions 12*f* to 12*j* are formed in a part of the cathode current collector 11. The subsequent steps may be the same as those of the method for producing the all-solid-state battery 100 according to the first embodiment. Accordingly, the all-solid-state battery 200 of the second embodiment can be produced.

4-3. Third Embodiment

The all-solid-state battery 300 of the third embodiment shown in FIG. 11 can be produced by the following steps, for example.

First, the cathode-side electrode laminate 30 (see the perspective view (c) of FIG. 8) is produced in the same manner as the current collector complex forming step and attaching step described above in "2. Method for producing an electrode laminate for all-solid-state batteries". The cathode-side electrode laminate 30 comprises the current collector complex 37 and the cathode active material layer 14 disposed on the current collector complex 37, in which the current collector complex 37 comprises the current collector portion 36 and the adhesive portions 12m and 12n; the current collector portion 36 comprises the cathode current collector 11 and the carbon coat layer 13; and the adhesive portions 12m and 12n are formed on the main surface of the cathode current collector 11, which is the main surface on the side where the carbon coat layer 13 is disposed. The subsequent steps may be the same as those of the method for producing the all-solid-state battery 100 according to the first embodiment. Accordingly, the all-solid-state battery 300 of the third embodiment can be produced.

5. Laminate-Type all-Solid-State Battery

Figure 12:
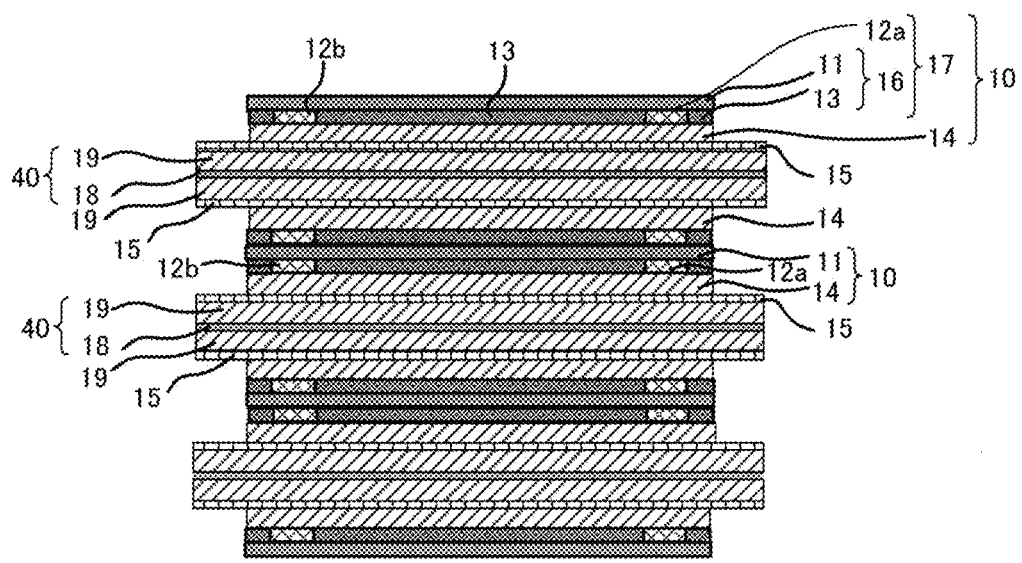
FIG. 12 is a schematic sectional view of a laminate-type all-solid-state battery produced by laminating a plurality of the all-solid-state batteries shown in FIG. 9.

FIG. 12 is a schematic sectional view of a laminate-type all-solid-state battery produced by laminating a plurality of the all-solid-state batteries shown in FIG. 9.

The laminate-type all-solid-state battery shown in FIG. 12 comprises the current collector complex 17 wherein the cathode active material layer 14-side main surface of the current collector portion 16 that comprises the cathode current collector 11 and the carbon coat layer 13, and the cathode active material layer 14-side main surfaces of the adhesive portions 12a and 12b are formed to be one flat surface, and the cathode active material layer 14 disposed on the current collector complex 17 and the current collector portion 16 are attached by the adhesive portions 12a and 12b.

Accordingly, the whole surface of the current collector complex 16, which is the surface on the side that is in contact with the cathode active material layer 14, is a flat surface having no level difference.

As described above, unlike the laminate-type all-solid-state battery shown in FIG. 13, the laminate-type all-solid-state battery shown in FIG. 12 does not have a large level difference. Accordingly, when the all-solid-state battery shown in FIG. 12 repeats charge-discharge cycles, the all-solid-state battery suppresses the occurrence of short circuits, which is due to a crack formed in the cathode active material layer 14 or the cathode current collector 11, and a decrease in the durability of the all-solid-state battery.

The laminate-type all-solid-state battery shown in FIG. 12 can be produced as follows, for example.

First, the laminate structure is produced, in which the anode active material layer 19, the solid electrolyte layer 15 and the cathode active material layer 14 are disposed in this order on both surfaces of the anode current collector 18. The production steps of the layers are not described here, since they are the same as those described above in "4. Method for producing an all-solid-state battery". Next, the current collector complex 17 is produced in the same manner as the current collector complex forming step of the above-described method for producing the electrode laminate of the first embodiment. Next, the main surface of the current collector complex 17, which is the main surface on the side where the adhesive portions 12a and 12b are exposed, and the cathode active material layer 14 of the above-described laminate structure are overlapped to dispose the laminate structure on the current collector complex 17.

By repeating this step, the laminate-type all-solid-state battery shown in FIG. 12 is obtained.

REFERENCE SIGNS LIST 10, 20, 30. Electrode laminate for all-solid-state batteries
11. Cathode current collector
12, 12a to 12n. Adhesive portion
12a' to 12j'. Concavity
13. Carbon coat layer
14. Cathode active material layer
15. Solid electrolyte layer
16, 26, 36. Current collector portion
17, 27, 37. Current collector complex
18. Anode current collector
19. Anode active material layer
40. Anode-side electrode laminate
50. Conventional electrode laminate (cathode-side)
60. Conventional electrode laminate (anode-side)
100, 200, 300. All-solid-state battery
R. Level difference
P. Confining pressure

The invention claimed is:

1. An electrode laminate for all-solid-state batteries, comprising:
a current collector complex comprising adhesive portions and a current collector portion that comprises at least a current collector and a carbon coat layer formed with one or more holes, wherein the carbon coat layer is formed directly on the current collector, and
an active material layer disposed on the current collector complex,
wherein an active material layer-side main surface of the current collector portion and active material layer-side main surfaces of the adhesive portions are formed in the holes to form a coplanar surface, and the current collector portion and the active material layer are attached by the adhesive portions.

2. A method for producing an electrode laminate for all-solid-state batteries, the method comprising:
forming a current collector complex comprising adhesive portions and a current collector portion that comprises at least a current collector and a carbon coat layer formed with one or more holes, wherein the carbon coat layer is formed directly on the current collector, main surfaces of the adhesive portions are formed in the one or more holes of the carbon coat layer to form a coplanar surface, and
attaching the current collector portion and an active material layer by the adhesive portions by forming the active material layer on a main surface of the current collector complex, which is a main surface on a side where the adhesive portions are exposed.

3. The electrode laminate for all-solid-state batteries according to claim 1, wherein the adhesive portions are disposed at the four corners of the carbon coat layer.

4. The electrode laminate for all-solid-state batteries according to claim 1, wherein the adhesive portion is disposed at the center of the carbon coat layer.

5. The method for producing the electrode laminate for all-solid-state batteries according to claim 2, wherein the adhesive portions are disposed at the four corners of the carbon coat layer.

6. The method for producing the electrode laminate for all-solid-state batteries according to claim 2, wherein the adhesive portion is disposed at the center of the carbon coat layer.

* * * * *